(12) United States Patent
Gorrell et al.

(10) Patent No.: US 7,718,977 B2
(45) Date of Patent: May 18, 2010

(54) STRAY CHARGED PARTICLE REMOVAL DEVICE

(75) Inventors: Jonathan Gorrell, Gainesville, FL (US); Mark Davidson, Florahome, FL (US)

(73) Assignee: Virgin Island Microsystems, Inc., Saint Thomas, VI (US)

( * ) Notice: Subject to any disclaimer, the term of this patent is extended or adjusted under 35 U.S.C. 154(b) by 923 days.

(21) Appl. No.: 11/418,127

(22) Filed: May 5, 2006

(65) Prior Publication Data

US 2007/0262234 A1    Nov. 15, 2007

(51) Int. Cl.
*G01K 1/08* (2006.01)

(52) U.S. Cl. .................. 250/397; 250/207; 250/396 R; 315/500

(58) Field of Classification Search ........... 315/3.5–3.6, 315/5.39, 39.51, 500, 501, 505; 250/207, 250/222.2, 286, 396 R, 400, 423 R, 492.24, 250/492.3, 493.1, 494.1, 397; 376/156; 356/243.4, 356/301, 454, 519
See application file for complete search history.

(56) References Cited

U.S. PATENT DOCUMENTS

| 1,948,384 | A | 2/1934 | Lawrence |
|---|---|---|---|
| 2,307,086 | A | 1/1943 | Varian et al. |
| 2,431,396 | A | 11/1947 | Hansell |
| 2,473,477 | A | 6/1949 | Smith |
| 2,634,372 | A | 4/1953 | Salisbury |
| 2,932,798 | A | 4/1960 | Kerst et al. |
| 2,944,183 | A | 7/1960 | Drexler |
| 2,966,611 | A | 12/1960 | Sandstrom |
| 3,231,779 | A | 1/1966 | White |
| 3,297,905 | A | 1/1967 | Rockwell et al. |
| 3,315,117 | A | 4/1967 | Udelson |
| 3,387,169 | A | 6/1968 | Farney |
| 3,543,147 | A | 11/1970 | Kovarik |
| 3,546,524 | A | 12/1970 | Stark |
| 3,560,694 | A | 2/1971 | White |

(Continued)

FOREIGN PATENT DOCUMENTS

EP    0237559 B1    12/1991

(Continued)

OTHER PUBLICATIONS

Search Report and Written Opinion mailed Apr. 23, 2008 in PCT Appln. No. PCT/US2006/022678.

(Continued)

*Primary Examiner*—David Hung Vu
*Assistant Examiner*—Tung X Le
(74) *Attorney, Agent, or Firm*—Davidson Berquist Jackson & Gowdey, LLP

(57) ABSTRACT

In order to reduce the exposure of a detector surface 180 of a photo-multiplier 160 to stray charged particles, an off-axis structure is interposed between the resonant structure and the detector surface of the photo-multiplier. By providing the off-axis structure with at least one reflective surface, photons are reflected toward the detector surface of the photo-multiplier while at the same time absorbing stray charged particles. Stray particles may be absorbed by the reflective surface or by any other part of the off-axis structure. The off-axis structure may additionally be provided with an electrical bias and/or an absorbing coating for absorbing stray charged particles.

13 Claims, 7 Drawing Sheets

U.S. PATENT DOCUMENTS

| | | |
|---|---|---|
| 3,571,642 A | 3/1971 | Westcott |
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,282,436 A | 8/1981 | Kapetanakos et al. |
| 4,450,554 A | 5/1984 | Steensma et al. |
| 4,453,108 A | 6/1984 | Freeman, Jr. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A | 2/1988 | Chang et al. |
| 4,740,963 A | 4/1988 | Eckley |
| 4,740,973 A | 4/1988 | Madey |
| 4,746,201 A | 5/1988 | Gould |
| 4,761,059 A | 8/1988 | Yeh et al. |
| 4,782,485 A | 11/1988 | Gollub |
| 4,789,945 A | 12/1988 | Niijima |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A | 12/1993 | Walsh |
| 5,268,788 A | 12/1993 | Fox et al. |
| 5,282,197 A | 1/1994 | Kreitzer |
| 5,283,819 A | 2/1994 | Glick et al. |
| 5,293,175 A | 3/1994 | Hemmie et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,504,341 A | 4/1996 | Glavish |
| 5,578,909 A | 11/1996 | Billen |
| 5,604,352 A | 2/1997 | Schuetz |
| 5,608,263 A | 3/1997 | Drayton et al. |
| 5,663,971 A | 9/1997 | Carlsten |
| 5,666,020 A | 9/1997 | Takemura |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A * | 5/1998 | Walstrom ............... 250/396 R |
| 5,767,013 A | 6/1998 | Park |
| 5,780,970 A | 7/1998 | Singh et al. |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 5,972,193 A | 10/1999 | Chou et al. |
| 6,005,347 A | 12/1999 | Lee |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,117,784 A | 9/2000 | Uzoh |
| 6,139,760 A | 10/2000 | Shim et al. |
| 6,180,415 B1 | 1/2001 | Schultz et al. |
| 6,195,199 B1 | 2/2001 | Yamada |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,309,528 B1 | 10/2001 | Taylor et al. |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,580,075 B2 | 6/2003 | Kametani et al. |
| 6,603,781 B1 | 8/2003 | Stinson et al. |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,534 B2 | 10/2003 | Madey et al. |
| 6,636,653 B2 | 10/2003 | Miracky et al. |
| 6,640,023 B2 | 10/2003 | Miller et al. |
| 6,642,907 B2 | 11/2003 | Hamada et al. |
| 6,687,034 B2 | 2/2004 | Wine et al. |
| 6,700,748 B1 | 3/2004 | Cowles et al. |
| 6,724,486 B1 | 4/2004 | Shull et al. |
| 6,738,176 B2 | 5/2004 | Rabinowitz et al. |
| 6,741,781 B2 | 5/2004 | Furuyama |

| | | | | | |
|---|---|---|---|---|---|
| 6,777,244 B2 | 8/2004 | Pepper et al. | 2003/1017997 | 9/2003 | Estes et al. |
| 6,782,205 B2 | 8/2004 | Trisnadi et al. | 2003/0206708 A1 | 11/2003 | Estes et al. |
| 6,791,438 B2 | 9/2004 | Takahashi et al. | 2003/0214695 A1 | 11/2003 | Abramson et al. |
| 6,800,877 B2 | 10/2004 | Victor et al. | 2004/0061053 A1 | 4/2004 | Taniguchi et al. |
| 6,801,002 B2 | 10/2004 | Victor et al. | 2004/0080285 A1 | 4/2004 | Victor et al. |
| 6,819,432 B2 | 11/2004 | Pepper et al. | 2004/0085159 A1 | 5/2004 | Kubena et al. |
| 6,829,286 B1 | 12/2004 | Guilfoyle et al. | 2004/0092104 A1 | 5/2004 | Gunn, III et al. |
| 6,834,152 B2 | 12/2004 | Gunn et al. | 2004/0108471 A1* | 6/2004 | Luo et al. ............... 250/493.1 |
| 6,870,438 B1 | 3/2005 | Shino et al. | 2004/0108473 A1 | 6/2004 | Melnychuk et al. |
| 6,871,025 B2 | 3/2005 | Maleki et al. | 2004/0108823 A1 | 6/2004 | Amaldi et al. |
| 6,885,262 B2 | 4/2005 | Nishimura et al. | 2004/0136715 A1 | 7/2004 | Kondo |
| 6,900,447 B2 | 5/2005 | Gerlach et al. | 2004/0150991 A1 | 8/2004 | Ouderkirk et al. |
| 6,909,092 B2 | 6/2005 | Nagahama | 2004/0171272 A1 | 9/2004 | Jin et al. |
| 6,909,104 B1 | 6/2005 | Koops | 2004/0180244 A1 | 9/2004 | Tour et al. |
| 6,924,920 B2 | 8/2005 | Zhilkov | 2004/0184270 A1 | 9/2004 | Halter |
| 6,936,981 B2 | 8/2005 | Gesley | 2004/0213375 A1 | 10/2004 | Bjorkholm et al. |
| 6,943,650 B2 | 9/2005 | Ramprasad et al. | 2004/0217297 A1 | 11/2004 | Moses et al. |
| 6,944,369 B2 | 9/2005 | Deliwala | 2004/0218651 A1 | 11/2004 | Iwasaki et al. |
| 6,952,492 B2 | 10/2005 | Tanaka et al. | 2004/0231996 A1 | 11/2004 | Webb |
| 6,953,291 B2 | 10/2005 | Liu | 2004/0240035 A1 | 12/2004 | Zhilkov |
| 6,954,515 B2 | 10/2005 | Bjorkholm et al. | 2004/0264867 A1 | 12/2004 | Kondo |
| 6,965,284 B2 | 11/2005 | Maekawa et al. | 2005/0023145 A1 | 2/2005 | Cohen et al. |
| 6,965,625 B2 | 11/2005 | Mross et al. | 2005/0045821 A1 | 3/2005 | Noji et al. |
| 6,972,439 B1 | 12/2005 | Kim et al. | 2005/0045832 A1* | 3/2005 | Kelly et al. ............... 250/397 |
| 6,995,406 B2 | 2/2006 | Tojo et al. | 2005/0054151 A1 | 3/2005 | Lowther et al. |
| 7,010,183 B2 | 3/2006 | Estes et al. | 2005/0067286 A1 | 3/2005 | Ahn et al. |
| 7,064,500 B2 | 6/2006 | Victor et al. | 2005/0082469 A1 | 4/2005 | Carlo |
| 7,068,948 B2 | 6/2006 | Wei et al. | 2005/0092929 A1 | 5/2005 | Schneiker |
| 7,092,588 B2 | 8/2006 | Kondo | 2005/0104684 A1 | 5/2005 | Wojcik et al. |
| 7,092,603 B2 | 8/2006 | Glebov et al. | 2005/0105690 A1 | 5/2005 | Pau et al. |
| 7,122,978 B2 | 10/2006 | Nakanishi et al. | 2005/0145882 A1 | 7/2005 | Taylor et al. |
| 7,130,102 B2 | 10/2006 | Rabinowitz | 2005/0152635 A1 | 7/2005 | Paddon et al. |
| 7,177,515 B2 | 2/2007 | Estes et al. | 2005/0162104 A1 | 7/2005 | Victor et al. |
| 7,194,798 B2 | 3/2007 | Bonhote et al. | 2005/0190637 A1 | 9/2005 | Ichimura et al. |
| 7,230,201 B1 | 6/2007 | Miley et al. | 2005/0194258 A1 | 9/2005 | Cohen et al. |
| 7,253,426 B2 | 8/2007 | Gorrell et al. | 2005/0201707 A1 | 9/2005 | Glebov et al. |
| 7,267,459 B2 | 9/2007 | Matheson | 2005/0201717 A1 | 9/2005 | Matsumura et al. |
| 7,267,461 B2 | 9/2007 | Kan et al. | 2005/0212503 A1 | 9/2005 | Deibele |
| 7,309,953 B2 | 12/2007 | Tiberi et al. | 2005/0231138 A1 | 10/2005 | Nakanishi et al. |
| 7,342,441 B2 | 3/2008 | Gorrell et al. | 2005/0249451 A1 | 11/2005 | Baehr-Jones et al. |
| 7,362,972 B2 | 4/2008 | Yavor et al. | 2005/0285541 A1 | 12/2005 | LeChevalier |
| 7,375,631 B2 | 5/2008 | Moskowitz et al. | 2006/0007730 A1 | 1/2006 | Nakamura et al. |
| 7,436,177 B2 | 10/2008 | Gorrell et al. | 2006/0018619 A1 | 1/2006 | Helffrich et al. |
| 7,442,940 B2 | 10/2008 | Gorrell et al. | 2006/0035173 A1 | 2/2006 | Davidson et al. |
| 7,443,358 B2 | 10/2008 | Gorrell et al. | 2006/0045418 A1 | 3/2006 | Cho et al. |
| 7,470,920 B2 | 12/2008 | Gorrell et al. | 2006/0050269 A1 | 3/2006 | Brownell |
| 7,473,917 B2 | 1/2009 | Singh | 2006/0060782 A1 | 3/2006 | Khursheed |
| 7,586,097 B2 | 9/2009 | Gorrell et al. | 2006/0062258 A1 | 3/2006 | Brau et al. |
| 7,586,167 B2 | 9/2009 | Gorrell et al. | 2006/0131176 A1 | 6/2006 | Hsu |
| 2001/0002315 A1 | 5/2001 | Schultz et al. | 2006/0131695 A1* | 6/2006 | Kuekes et al. ............... 257/618 |
| 2001/0025925 A1 | 10/2001 | Abe et al. | 2006/0159131 A1 | 7/2006 | Liu et al. |
| 2002/0009723 A1 | 1/2002 | Hefti | 2006/0164496 A1 | 7/2006 | Tokutake et al. |
| 2002/0027481 A1 | 3/2002 | Fiedziuszko | 2006/0187794 A1 | 8/2006 | Harvey et al. |
| 2002/0036121 A1 | 3/2002 | Ball et al. | 2006/0208667 A1 | 9/2006 | Lys et al. |
| 2002/0036264 A1 | 3/2002 | Nakasuji et al. | 2006/0216940 A1 | 9/2006 | Gorrell et al. |
| 2002/0053638 A1 | 5/2002 | Winkler et al. | 2006/0243925 A1 | 11/2006 | Barker et al. |
| 2002/0068018 A1 | 6/2002 | Pepper et al. | 2006/0274922 A1 | 12/2006 | Ragsdale |
| 2002/0070671 A1 | 6/2002 | Small | 2007/0003781 A1 | 1/2007 | de Rochemont |
| 2002/0071457 A1 | 6/2002 | Hogan | 2007/0013765 A1 | 1/2007 | Hudson et al. |
| 2002/0122531 A1 | 9/2002 | Whitham | 2007/0075263 A1 | 4/2007 | Gorrell et al. |
| 2002/0135665 A1 | 9/2002 | Gardner | 2007/0075264 A1 | 4/2007 | Gorrell et al. |
| 2002/0139961 A1 | 10/2002 | Kinoshita et al. | 2007/0085039 A1 | 4/2007 | Gorrell et al. |
| 2002/0158295 A1 | 10/2002 | Armgarth et al. | 2007/0086915 A1 | 4/2007 | LeBoeuf et al. |
| 2002/0191650 A1 | 12/2002 | Madey et al. | 2007/0116420 A1 | 5/2007 | Estes et al. |
| 2003/0010979 A1 | 1/2003 | Pardo et al. | 2007/0146704 A1* | 6/2007 | Schmidt et al. ............. 356/338 |
| 2003/0012925 A1 | 1/2003 | Gorrell | 2007/0152176 A1 | 7/2007 | Gorrell et al. |
| 2003/0016421 A1 | 1/2003 | Small | 2007/0154846 A1 | 7/2007 | Gorrell et al. |
| 2003/0034535 A1 | 2/2003 | Barenburu et al. | 2007/0194357 A1 | 8/2007 | Oohashi |
| 2003/0103150 A1 | 6/2003 | Catrysse et al. | 2007/0200940 A1 | 8/2007 | Gruhlke et al. |
| 2003/0106998 A1 | 6/2003 | Colbert et al. | 2007/0238037 A1 | 10/2007 | Wuister et al. |
| 2003/0155521 A1* | 8/2003 | Feuerbaum ............. 250/396 R | 2007/0252983 A1* | 11/2007 | Tong et al. ............... 356/301 |
| 2003/0158474 A1 | 8/2003 | Scherer et al. | 2007/0258492 A1 | 11/2007 | Gorrell |
| 2003/0164947 A1 | 9/2003 | Vaupel | 2007/0258689 A1 | 11/2007 | Gorrell et al. |

| | | | |
|---|---|---|---|
| 2007/0258690 A1 | 11/2007 | Gorrell et al. | |
| 2007/0259641 A1 | 11/2007 | Gorrell | |
| 2007/0264023 A1 | 11/2007 | Gorrell et al. | |
| 2007/0264030 A1 | 11/2007 | Gorrell et al. | |
| 2007/0282030 A1 | 12/2007 | Anderson et al. | |
| 2007/0284527 A1 | 12/2007 | Zani et al. | |
| 2008/0069509 A1 | 3/2008 | Gorrell et al. | |
| 2008/0302963 A1* | 12/2008 | Nakasuji et al. | 250/310 |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/025785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

Search Report and Written Opinion mailed Apr. 3, 2008 in PCT Appln. No. PCT/US2006/027429.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appln. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.
U.S. Appl. No. 11/418,082, filed May 5, 2006, Gorrell et al.
J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
"Array of Nanoklystrons for Frequency Agility or Redundancy," NASA's Jet Propulsion Laboratory, NASA Tech Briefs, NPO-21033. 2001.
"Antenna Arrays." May 18, 2002. www.tpub.com/content/neets/14183/css/14183_159.htm.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.

Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-IR, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.
Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.
Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.
Ives, Lawrence et al., "Development of Backward Wave Oscillators for Terahertz Applications," Terahertz for Military and Security Applications, Proceedings of SPIE vol. 5070 (2003), pp. 71-82.
Ives, R. Lawrence, "IVEC Summary, Session 2, Sources I" 2002.
Jonietz, Erika, "Nano Antenna Gold nanospheres show path to all-optical computing," Technology Review, Dec. 2005/Jan. 2006, p. 32.
Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995, pp. 117-121.
Joo, Youngcheol et al., "Fabrication of Monolithic Microchannels for IC Chip Cooling," 1995, Mechanical, Aerospace and Nuclear Engineering Department, University of California at Los Angeles.
Jung, K.B. et al., "Patterning of Cu, Co, Fe, and Ag for magnetic nanostructures," J. Vac. Sci. Technol. A 15(3), May/Jun. 1997, pp. 1780-1784.
Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.
Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.
Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.
Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.
Manohara, Harish et al., "Field Emission Testing of Carbon Nanotubes for THz Frequency Vacuum Microtube Sources." Abstract. Dec. 2003. from SPIEWeb.
McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.
Meyer, Stephan, "Far IR, Sub-MM & MM Detector Technology Workshop Summary," Oct. 2002. (may date the Manohara documents).
Mokhoff, Nicolas, "Optical-speed light detector promises fast space talk," EETimes Online, Mar. 20, 2006, from website: www.eetimes.com/showArticle.jhtml?articleID=183701047.
Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.
Nguyen, Phucanh et al., "Reactive ion etch of patterned and blanket silver thin films in C12/O2 and O2 glow discharges," J. Vac. Sci, Technol. B. 17 (5), Sep./Oct. 1999, American Vacuum Society, pp. 2204-2209.
Phototonics Research, "Surface-Plasmon-Enhanced Random Laser Demonstrated," Phototonics Spectra, Feb. 2005, pp. 112-113.
Potylitsin, A.P., "Resonant Diffraction Radiation and Smith-Purcell Effect," (Abstract), arXiv: physics/9803043 v2 Apr. 13, 1998.
Potylitsyn, A.P., "Resonant Diffraction Radiation and Smith-Purcell Effect," Physics Letters A, Feb. 2, 1998, pp. 112-116, A 238, Elsevier Science B.V.
S. Hoogland et al., "A solution-processed 1.53 μm quantum dot laser with temperature-invariant emission wavelength," Optics Express, vol. 14, No. 8, Apr. 17, 2006, pp. 3273-3281.
Savilov, Andrey V., "Stimulated Wave Scattering in the Smith-Purcell FEL," IEEE Transactions on Plasma Science, Oct. 2001, pp. 820-823, vol. 29 No. 5, IEEE.
Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.
Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.
Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.
Shih, I. et al., "Experimental Investigations of Smith-Purcell Radiation," Journal of the Optical Society of America, Mar. 1990, pp. 351-356, vol. 7, No. 3, Optical Society of America.
Shih, I. et al., "Measurements of Smith-Purcell Radiation," Journal of the Optical Society of America, Mar. 1990, pp. 345-350, vol. 7 No. 3, Optical Society of America.
Swartz, J.C. et al., "THz-FIR Grating Coupled Radiation Source," Plasma Science, 1998. 1D02, p. 126.
Temkin, Richard, "Scanning with Ease Through the Far Infrared," Science, New Series, May 8, 1998, p. 854, vol. 280, No. 5365, American Association for the Advancement of Science.
Walsh, J.E., et al., 1999. From website: http://www.ieee.org/organizations/pubs/newsletters/leos/feb99/hot2.htm.
Wentworth, Stuart M. et al., "Far-Infrared Composite Microbolometers," IEEE MTT-S Digest, 1990, pp. 1309-1310.
Yamamoto, N. et al., "Photon Emission From Silver Particles Induced by a High-Energy Electron Beam," Physical Review B, Nov. 6, 2001, pp. 205419-1-205419-9, vol. 64, The American Physical Society.
Yokoo, K. et al., "Smith-Purcell Radiation at Optical Wavelength Using a Field-Emitter Array," Technical Digest of IVMC, 2003, pp. 77-78.
Zeng, Yuxiao et al., "Processing and encapsulation of silver patterns by using reactive ion etch and ammonia anneal," Materials Chemistry and Physics 66, 2000, pp. 77-82.
International Search Report and Written Opinion mailed Nov. 23, 2007 in International Application No. PCT/US2006/022786.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.
Search Report and Written Opinion mailed Sep. 21, 2007 in PCT Appln. No. PCT/US2006/022688.
Search Report and Written Opinion mailed Sep. 25, 2007 in PCT appln. No. PCT/US2006/022681.
Search Report and Written Opinion mailed Sep. 26, 2007 in PCT Appln. No. PCT/US2006/024218.
Search Report and Written Opinion mailed Aug. 24, 2007 in PCT Appln. No. PCT/US2006/022768.
Search Report and Written Opinion mailed Aug. 31, 2007 in PCT Appln. No. PCT/US2006/022680.
Search Report and Written Opinion mailed Jul. 16, 2007 in PCT Appln. No. PCT/US2006/022774.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776.
Search Report and Written Opinion mailed Jun. 20, 2007 in PCT Appln. No. PCT/US2006/022779.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.
Search Report and Written Opinion mailed Sep. 17, 2007 in PCT Appln. No. PCT/US2006/022689.
Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
"An Early History—Invention of the Klystron," http://varianinc.com/cgi-bin/advprint/print.cgi?cid=KLQNPPJJFJ, printed on Dec. 26, 2008.
"An Early History—The Founding of Varian Associates," http://varianinc.com/cgi-bin/advprint/print.cgi?cid=KLQNPPJJFJ, printed on Dec. 26, 2008.

"Chapter 3 X-Ray Tube," http://compepid.tuskegee.edu/syllabi/clinical/small/radiology/chapter..., printed from tuskegee.edu on Dec. 29, 2008.

"Diagnostic imaging modalities—Ionizing vs non-ionizing radiation," http://info.med.yale.edu/intmed/cardio/imaging/techniques/ionizing_v..., printed from Yale University School of Medicine on Dec. 29, 2008.

"Frequently Asked Questions," Luxtera Inc., found at http://www.luxtera.com/technology_faq.htm, printed on Dec. 2, 2005, 4 pages.

"Klystron Amplifier," http://www.radartutorial.eu/08.transmitters/tx12.en.html, printed on Dec. 26, 2008.

"Klystron is a Micowave Generator," http://www2.slac.stanford.edu/vvc/accelerators/klystron.html, printed on Dec. 26, 2008.

"Klystron," http:en.wikipedia.org/wiki/Klystron, printed on Dec. 26, 2008.

"Making X-rays," http://www.fnrfscience.cmu.ac.th/theory/radiation/xray-basics.html, printed on Dec. 29, 2008.

"Microwave Tubes," http://www.tpub.com/neets/book11/45b.htm, printed on Dec. 26, 2008.

"Notice of Allowability" mailed on Jan. 17, 2008 in U.S. Appl. No. 11/418,082, filed May 5, 2006.

"Technology Overview," Luxtera, Inc., found at http://www.luxtera.com/technology.htm, printed on Dec. 2, 2005, 1 page.

"The Reflex Klystron," http://www.fnrfscience.cmu.ac.th/theory/microwave/microwave%2, printed from Fast Netoron Research Facility on Dec. 26, 2008.

"x-ray tube," http://www.answers.com/topic/x-ray-tube, printed on Dec. 29, 2008.

Mar. 24, 2006 PTO Office Action in U.S. Appl. No. 10/917,511.
Mar. 25, 2008 PTO Office Action in U.S. Appl. No. 11/411,131.
Apr. 8, 2008 PTO Office Action in U.S. Appl. No. 11/325,571.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 16, 2008 Response to PTO Office Action of Dec. 14, 2007 in U.S. Appl. No. 11/418,264.
Jun. 20, 2008 Response to PTO Office Action of Mar. 25, 2008 in U.S. Appl. No. 11/411,131.
Aug. 14, 2006 PTO Office Action in U.S. Appl. No. 10/917,511.
Sep. 1, 2006 Response to PTO Office Action of Aug. 14, 2006 in U.S. Appl. No. 10/917,511.
Sep. 12, 2005 Response to PTO Office Action of May 10, 2005 in U.S. Appl. No. 10/917,511.
Sep. 14, 2007 PTO Office Action in U.S. Appl. No. 11/411,131.
Oct. 19, 2007 Response to PTO Office Action of May 21, 2007 in U.S. Appl. No. 11/418,087.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 20, 2007 PTO Office Action in U.S. Appl. No. 11/418,087.
Corcoran, Elizabeth, "Ride the Light," Forbes Magazine, Apr. 11, 2005, pp. 68-70.
European Search Report mailed Mar. 3, 2009 in European Application No. 06852028.7.
Neo et al., "Smith-Purcell Radiation from Ultraviolet to Infrared Using a Si-field Emitter" Vacuum Electronics Conference, 2007, IVEC '07, IEEE International May 2007.
Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.
Sartori, Gabriele, "CMOS Photonics Platform," Luxtera, Inc., Nov. 2005, 19 pages.
Search Report and Writen Opinion mailed Jul. 14, 2008 in PCT Appln. No. PCT/US2006/022773.
Search Report and Written Opinion mailed Apr. 23, 2008 in PCT Appln. No. PCT/US2006/022678.
Search Report and Written Opinion mailed Apr. 3, 2008 in PCT Appln. No. PCT/US2006/027429.
Search Report and Written Opinion mailed Aug. 19, 2008 in PCT Appln. No. PCT/US2007/008363.
Search Report and Written Opinion mailed Jul. 16, 2008 in PCT Appln. No. PCT/US2006/022766.
Search Report and Written Opinion mailed Jul. 28, 2008 in PCT Appln. No. PCT/US2006/022782.
Search Report and Written Opinion mailed Jul. 3, 2008 in PCT Appln. No. PCT/US2006/022690.
Search Report and Written Opinion mailed Jul. 3, 2008 in PCT Appln. No. PCT/US2006/022778.
Search Report and Written Opinion mailed Jul. 7, 2008 in PCT Appln. No. PCT/US2006/022686.
Search Report and Written Opinion mailed Jul. 7, 2008 in PCT Appln. No. PCT/US2006/022785.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appln. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.
Search Report and Written Opinion mailed Sep. 2, 2008 in PCT Appln. No. PCT/US2006/022769.
Search Report and Written Opinion mailed Sep. 26, 2008 in PCT Appln. No. PCT/US2007/00053.
Search Report and Written Opinion mailed Sep. 3, 2008 in PCT Appln. No. PCT/US2006/022770.
U.S. Appl. No. 11/203,407—Nov. 13, 2008 PTO Office Action.
U.S. Appl. No. 11/238,991—Dec. 6, 2006 PTO Office Action.
U.S. Appl. No. 11/238,991—Jun. 6, 2007 Response to PTO Office Action of Dec. 6, 2006.
U.S. Appl. No. 11/238,991—Sep. 10, 2007 PTO Office Action.
U.S. Appl. No. 11/238,991—Mar. 6, 2008 Response to PTO Office Action of Sep. 10, 2007.
U.S. Appl. No. 11/238,991—Jun. 27, 2008 PTO Office Action.
U.S. Appl. No. 11/238,991—Dec. 29, 2008 Response to PTO Office Action of Jun. 27, 2008.
U.S. Appl. No. 11/238,991—Mar. 24, 2009 PTO Office Action.
U.S. Appl. No. 11/243,477—Apr. 25, 2008 PTO Office Action.
U.S. Appl. No. 11/243,477—Oct. 24, 2008 Response to PTO Office Action of Apr. 25, 2008.
U.S. Appl. No. 11/243,477—Jan. 7, 2009 PTO Office Action.
U.S. Appl. No. 11/325,448—Jun. 16, 2008 PTO Office Action.
U.S. Appl. No. 11/325,448—Dec. 16, 2008 Response to PTO Office Action of Jun. 16, 2008.
U.S. Appl. No. 11/325,534—Jun. 11, 2008 PTO Office Action.
U.S. Appl. No. 11/325,534—Oct. 15, 2008 Response to PTO Office Action of Jun. 11, 2008.
U.S. Appl. No. 11/353,208—Jan. 15, 2008 PTO Office Action.
U.S. Appl. No. 11/353,208—Mar. 17, 2008 PTO Office Action.
U.S. Appl. No. 11/353,208—Sep. 15, 2008 Response to PTO Office Action of Mar. 17, 2008.
U.S. Appl. No. 11/353,208—Dec. 24, 2008 PTO Office Action.
U.S. Appl. No. 11/353,208—Dec. 30, 2008 Response to PTO Office Action of Dec. 24, 2008.
U.S. Appl. No. 11/400,280—Oct. 16, 2008 PTO Office Action.
U.S. Appl. No. 11/400,280—Oct. 24, 2008 Response to PTO Office Action of Oct. 16, 2008.
U.S. Appl. No. 11/410,905—Sep. 26, 2008 PTO Office Action.
U.S. Appl. No. 11/410,905—Mar. 26, 2009 Response to PTO Office Action of Sep. 26, 2008.
U.S. Appl. No. 11/410,924—Mar. 6, 2009 PTO Office Action.
U.S. Appl. No. 11/411,120—Mar. 19, 2009 PTO Office Action.
U.S. Appl. No. 11/411,129—Jan. 16, 2009 Office Action.

U.S. Appl. No. 11/411,130—May 1, 2008 PTO Office Action.
U.S. Appl. No. 11/411,130—Oct. 29, 2008 Response to PTO Office Action of May 1, 2008.
U.S. Appl. No. 11/417,129—Jul. 11, 2007 PTO Office Action.
U.S. Appl. No. 11/417,129—Dec. 17, 2007 Response to PTO Office Action of Jul. 11, 2007.
U.S. Appl. No. 11/417,129—Dec. 20, 2007 Response to PTO Office Action of Jul. 11, 2007.
U.S. Appl. No. 11/417,129—Apr. 17, 2008 PTO Office Action.
U.S. Appl. No. 11/417,129—Jun. 19, 2008 Response to PTO Office Action of Apr. 17, 2008.
U.S. Appl. No. 11/418,079—Apr. 11, 2008 PTO Office Action.
U.S. Appl. No. 11/418,079—Oct. 7, 2008 Response to PTO Office Action of Apr. 11, 2008.
U.S. Appl. No. 11/418,079—Feb. 12, 2009 PTO Office Action.
U.S. Appl. No. 11/418,080—Mar. 18, 2009 PTO Office Action.
U.S. Appl. No. 11/418,082—Jan. 17, 2007 PTO Office Action.
U.S. Appl. No. 11/418,083—Jun. 20, 2008 PTO Office Action.
U.S. Appl. No. 11/418,083—Dec. 18, 2008 Response to PTO Office Action of Jun. 20, 2008.
U.S. Appl. No. 11/418,084—Nov. 5, 2007 PTO Office Action.
U.S. Appl. No. 11/418,084—May 5, 2008 Response to PTO Office Action of Nov. 5, 2007.
U.S. Appl. No. 11/418,084—Aug. 19, 2008 PTO Office Action.
U.S. Appl. No. 11/418,084—Feb. 19, 2009 Response to PTO Office Action of Aug. 19, 2008.
U.S. Appl. No. 11/418,085—Aug. 10, 2007 PTO Office Action.
U.S. Appl. No. 11/418,085—Nov. 13, 2007 Response to PTO Office Action of Aug. 10, 2007.
U.S. Appl. No. 11/418,085—Feb. 12, 2008 PTO Office Action.
U.S. Appl. No. 11/418,085—Aug. 12, 2008 Response to PTO Office Action of Feb 12, 2008.
U.S. Appl. No. 11/418,085—Sep. 16, 2008 PTO Office Action.
U.S. Appl. No. 11/418,085—Mar. 6, 2009 Response to PTO Office Action of Sep. 16, 2008.
U.S. Appl. No. 11/418,087—Dec. 29, 2006 Response to PTO Office Action of Dec. 4, 2006.
U.S. Appl. No. 11/418,087—Feb. 15, 2007 PTO Office Action.
U.S. Appl. No. 11/418,087—Mar. 6, 2007 Response to PTO Office Action of Feb. 15, 2007.
U.S. Appl. No. 11/418,088—Jun. 9, 2008 PTO Office Action.
U.S. Appl. No. 11/418,088—Dec. 8, 2008 Response to PTO Office Action of Jun. 9, 2008.
U.S. Appl. No. 11/418,089—Mar. 21, 2008 PTO Office Action.
U.S. Appl. No. 11/418,089—Jun. 23, 2008 Response to PTO Office Action of Mar. 21, 2008.
U.S. Appl. No. 11/418,089—Sep. 30, 2008 PTO Office Action.
U.S. Appl. No. 11/418,089—Mar. 30, 2009 Response to PTO Office Action of Sep. 30, 2008.
U.S. Appl. No. 11/418,091—Jul. 30, 2007 PTO Office Action.
U.S. Appl. No. 11/418,091—Nov. 27, 2007 Response to PTO Office Action of Jul. 30, 2007.
U.S. Appl. No. 11/418,091—Feb. 26, 2008 PTO Office Action.
U.S. Appl. No. 11/418,097—Jun. 2, 2008 PTO Office Action.
U.S. Appl. No. 11/418,097—Dec. 2, 2008 Response to PTO Office Action of Jun. 2, 2008.
U.S. Appl. No. 11/418,097—Feb. 18, 2009 PTO Office Action.
U.S. Appl. No. 11/418,099—Jun. 23, 2008 PTO Office Action.
U.S. Appl. No. 11/418,099—Dec. 23, 2008 Response to PTO Office Action of Jun. 23, 2008.
U.S. Appl. No. 11/418,100—Jan. 12, 2009 PTO Office Action.
U.S. Appl. No. 11/418,123—Apr. 25, 2008 PTO Office Action.
U.S. Appl. No. 11/418,123—Oct. 27, 2008 Response to PTO Office Action of Apr. 25, 2008.
U.S. Appl. No. 11/418,123—Jan. 26, 2009 PTO Office Action.
U.S. Appl. No. 11/418,124—Oct. 1, 2008 PTO Office Action.
U.S. Appl. No. 11/418,124—Feb. 2, 2009 Response to PTO Office Action of Oct. 1, 2008.
U.S. Appln. No. 11/418,124—Mar. 13, 2009 PTO Office Action.
U.S. Appl. No. 11/418,126—Oct. 12, 2006 PTO Office Action.
U.S. Appl. No. 11/418,126—Feb. 12, 2007 Response to PTO Office Action of Oct. 12, 2006 (Redacted).
U.S. Appl. No. 11/418,126—Jun. 6, 2007 PTO Office Action.
U.S. Appl. No. 11/418,126—Aug. 6, 2007 Response to PTO Office Action of Jun. 6, 2007.
U.S. Appl. No. 11/418,126—Nov. 2, 2007 PTO Office Action.
U.S. Appl. No. 11/418,126—Feb. 22, 2008 Response to PTO Office Action of Nov. 2, 2007.
U.S. Appl. No. 11/418,126—Jun. 10, 2008 PTO Office Action.
U.S. Appl. No. 11/418,128—Dec. 16, 2008 PTO Office Action.
U.S. Appl. No. 11/418,128—Dec. 31, 2008 Response to PTO Office Action of Dec. 16, 2008.
U.S. Appl. No. 11/418,128—Feb. 17, 2009 PTO Office Action.
U.S. Appl. No. 11/418,129—Dec. 16, 2008 Office Action.
U.S. Appl. No. 11/418,129—Dec. 31, 2008 Response to PTO Office Action of Dec. 16, 2008.
U.S. Appl. No. 11/418,244—Jul. 1, 2008 PTO Office Action.
U.S. Appl. No. 11/418,244—Nov. 25, 2008 Response to PTO Office Action of Jul. 1, 2008.
U.S. Appl. No. 11/418,263—Sep. 24, 2008 PTO Office Action.
U.S. Appl. No. 11/418,263—Dec. 24, 2008 Response to PTO Office Action of Sep. 24, 2008.
U.S. Appl. No. 11/418,263—Mar. 9, 2009 PTO Office Action.
U.S. Appl. No. 11/418,315—Mar. 31, 2008 PTO Office Action.
U.S. Appl. No. 11/418,318—Mar. 31, 2009 PTO Office Action.
U.S. Appl. No. 11/441,219—Jan. 7, 2009 PTO Office Action.
U.S. Appl. No. 11/522,929—Oct. 22, 2007 PTO Office Action.
U.S. Appl. No. 11/522,929—Feb. 21, 2008 Response to PTO Office Action of Oct. 22, 2007.
U.S. Appl. No. 11/641,678—Jul. 22, 2008 PTO Office Action.
U.S. Appl. No. 11/641,678—Jan. 22, 2009 Response to Office Action of Jul. 22, 2008.
U.S. Appl. No. 11/711,000—Mar. 6, 2009 PTO Office Action.
U.S. Appl. No. 11/716,552—Feb. 12, 2009 Response to PTO Office Action of Feb. 9, 2009.
U.S. Appl. No. 11/716,552—Jul. 3, 2009 PTO Office Action.
"Notice of Allowability" mailed on Jul. 2, 2009 in U.S. Appl. No. 11/410,905, filed Apr. 26, 2006.
"Notice of Allowability" mailed on Jun. 30, 2009 in U.S. Appl. No. 11/418,084, filed May 5, 2006.
B. B Loechel et al., "Fabrication of Magnetic Microstructures by Using Thick Layer Resists", Microelectronics Eng., vol. 21, pp. 463-466 (1993).
Magellan 8500 Scanner Product Reference Guide, PSC Inc., 2004, pp. 6-27—F18.
Magellan 9500 with SmartSentry Quick Reference Guide, PSC Inc., 2004.
Response to Non-Final Office Action submitted May 13, 2009 in U.S. Appl. No. 11/203,407.
U.S. Appl. No. 11/238,991—May 11, 2009 PTO Office Action.
U.S. Appl. No. 11/350,812—Apr. 17, 2009 Office Action.
U.S. Appl. No. 11/411,130—Jun. 23, 2009 PTO Office Action.
U.S. Appl. No. 11/418,089—Jul. 15, 2009 PTO Office Action.
U.S. Appl. No. 11/418,096—Jun. 23, 2009 PTO Office Action.
U.S. Appl. No. 11/433,486—Jun. 19, 2009 PTO Office Action.
Brau et al., "Tribute to John E Walsh", Nuclear Instruments and Methods in Physics Research Section A. Accelerators, Spectrometers, Detectors and Associated Equipment, vol. 475, Issues 1-3, Dec. 21, 2001, pp. xiii-xiv.
Kapp, et al., "Modification of a scanning electron microscope to produce Smith—Purcell radiation", Rev. Sci. Instrum. 75, 4732 (2004).
Scherer et al. "Photonic Crystals for Confining, Guiding, and Emitting Light", IEEE Transactions on Nanotechnology, vol. 1, No. 1, Mar. 2002, pp. 4-11.
U.S. Appl. No. 11/203,407—Jul. 17, 2009 PTO Office Action.
U.S. Appl. No. 11/418,097—Sep. 16, 2009 PTO Office Action.
U.S. Appl. No. 11/418,123—Aug. 11, 2009 PTO Office Action.
U.S. Appl. No. 11/418,365—Jul. 23, 2009 PTO Office Action.
U.S. Appl. No. 11/441,240—Aug. 31, 2009 PTO Office Action.
Urata et al., "Superradiant Smith-Purcell Emission", Phys. Rev. Lett. 80, 516-519 (1998).

* cited by examiner

STRAY CHARGED PARTICLE REMOVAL DEVICE

CROSS-REFERENCE TO RELATED APPLICATIONS

This application is related to (1) U.S. patent application Ser. No. 11/238,991, titled "Ultra-Small Resonating Charged Particle Beam Modulator," and filed Sep. 30, 2005, (2) U.S. patent application Ser. No. 10/917,511, filed on Aug. 13, 2004, entitled "Patterning Thin Metal Film by Dry Reactive Ion Etching," and to U.S. application Ser. No. 11/203,407, filed on Aug. 15, 2005, entitled "Method Of Patterning Ultra-Small Structures," (3) U.S. application Ser. No. 11/243,476, titled "Structures And Methods For Coupling Energy From An Electromagnetic Wave," filed on Oct. 5, 2005, and (4) U.S. application Ser. No. 11/243,477, entitled "Electron Beam Induced Resonance," filed on Oct. 5, 2005, all of which are commonly owned with the present application at the time of filing, and the entire contents of each of which are incorporated herein by reference.

BACKGROUND OF THE INVENTION

1. Field of the Invention

The present invention is directed to a device or system for removing stray charged particles during the detection of photons in a high frequency system, and in one embodiment to a reflector-based system with a stray electron absorbing structure between a source of photons and a photo-multiplier.

2. Discussion of the Background

In systems that utilize photo-multipliers to detect the arrival of photo-emissions, known photo-multipliers can produce false detection readings when stray electrons, either instead of or in addition to the desired photons, strike a detector surface in a photo-multiplier. Such a false detection may lead the photo-multiplier to incorrectly indicate the number of photons that were incident on the detector surface.

SUMMARY OF THE INVENTION

It is an object of the present invention to reduce the number of stray electrons that are incident on the detector surface of a photo-multiplier when utilizing a resonant structure resonating at a frequency in excess of the microwave frequency.

According to a first embodiment of the present invention, the detector surface of a photo-multiplier is protected from exposure to stray charged particles emitted from or near a resonant structure resonating at a frequency in excess of the microwave frequency by creating an indirect path between the resonant structure and the detector surface.

According to one implementation of such an embodiment, the present invention includes a structure for absorbing stray charged particles (e.g., electrons) while reflecting electromagnetic radiation (e.g., photons) off of a reflective surface. In one configuration the reflective surface is a mirror.

According to another implementation of the first embodiment, the present invention includes an electrically-biased structure for attracting and absorbing stray charged particles while reflecting photons off of a reflective surface. In one configuration the reflective surface is a mirror.

In at least one exemplary embodiment, the reflective surface is coated with a layer of material that enhances absorption of the stray charged particles.

According to a second embodiment of the present invention, the detector surface of a photo-multiplier is protected from exposure to stray charged particles emitted from or near a resonant structure resonating at a frequency in excess of the microwave frequency by creating a particle barrier between the resonant structure and the detector surface where the particle barrier allows the transmission or passage of electromagnetic radiation (e.g., photons).

GLOSSARY

As used throughout this document:

The phrase "ultra-small resonant structure" shall mean any structure of any material, type or microscopic size that by its characteristics causes electrons to resonate at a frequency in excess of the microwave frequency.

The term "ultra-small" within the phrase "ultra-small resonant structure" shall mean microscopic structural dimensions and shall include so-called "micro" structures, "nano" structures, or any other very small structures that will produce resonance at frequencies in excess of microwave frequencies.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
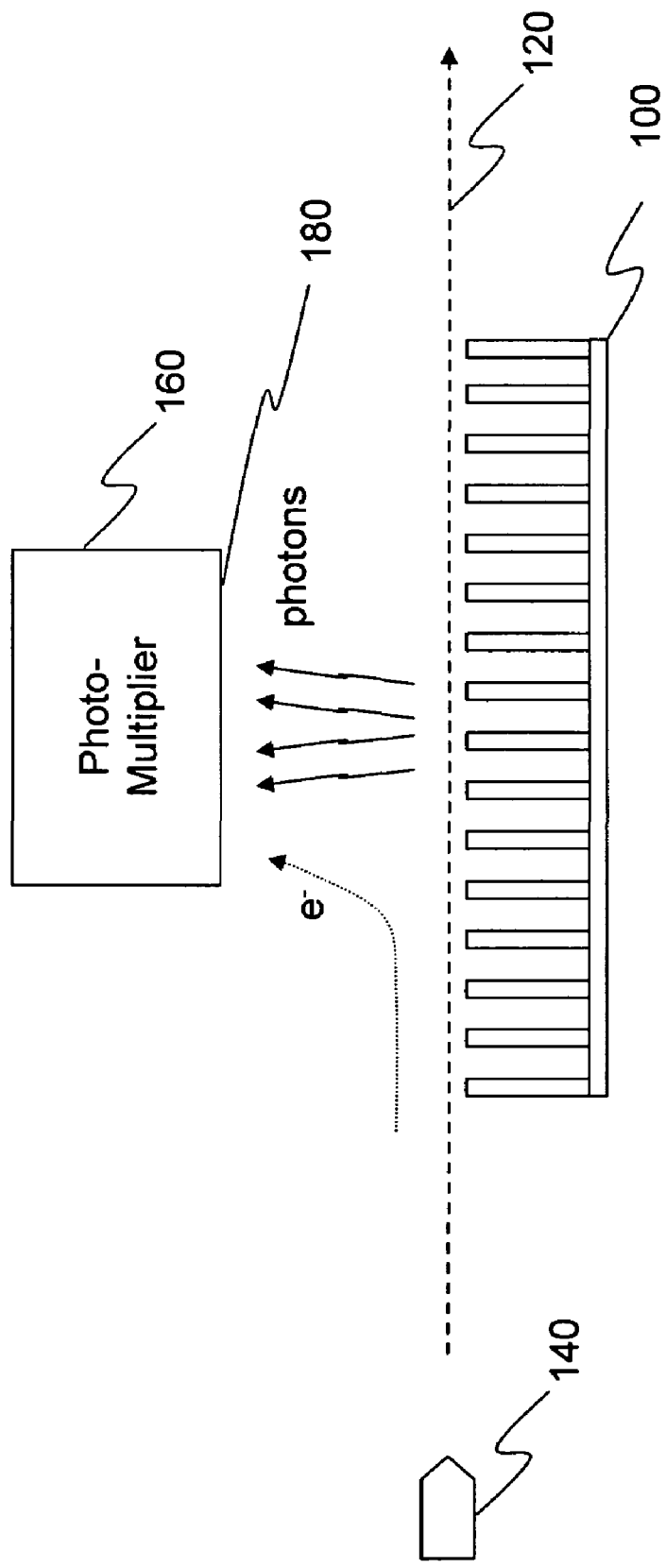
FIG. 1 is a top view of a photo-multiplier which is exposed to both photons and stray electrons and which generates false readings of an amount of light incident on the detector surface of the photo-multiplier.

As illustrated in FIG. 1, when a recently discovered resonant structure 100 is exposed to (or brought into close proximity to) a beam 120 of charged particles (e.g., electrons or ions) from a charged particle source 140, the resonant structure 100 can emit electromagnetic radiation (such as photons in the form of light, where the photons have a frequency in excess of the microwave frequency) which can be detected by a photo-multiplier 160. When the beam 120 is an electron beam, the beam 120 may be produced by an electron microscope, cathode, or any other electron source.

However, in addition to the electromagnetic radiation striking the detector surface 180 of the photo-multiplier 160, stray charged particles, illustrated in FIG. 1 as stray electrons, can also collide with the detector surface 180 of the photo-multiplier 160 if the detector surface 180 of the photo-multiplier 160 is left exposed. When exposed to the stray charged particles, the photo-multiplier 160 may register an incorrect or false number of photons, leading the output of the photo-multiplier 160 to incorrectly signal the number of photons incident on the detector surface 180 of the photo-multiplier 160.

Figure 2:
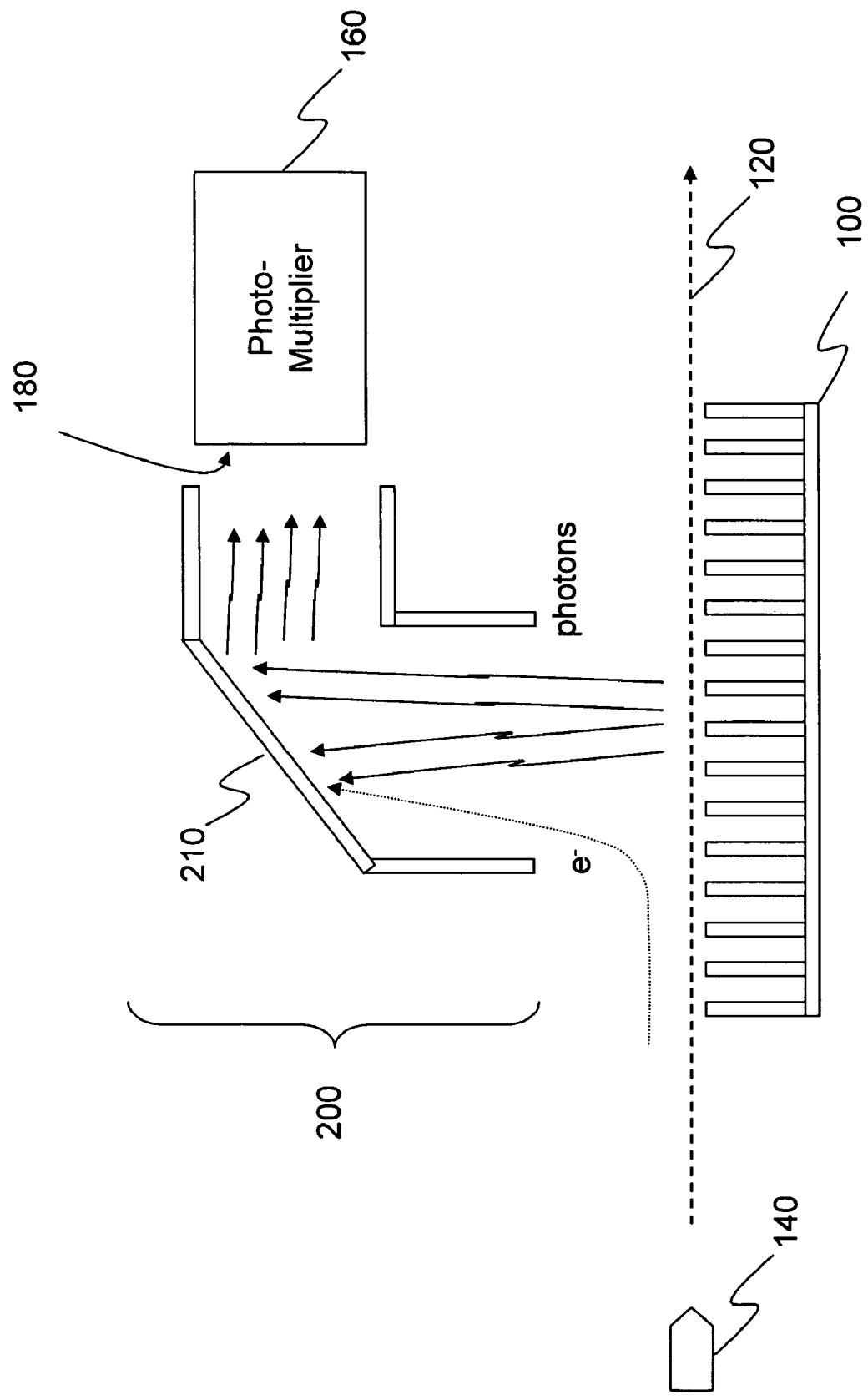
FIG. 2 is a top view of a photo-multiplier which is protected from stray charged particles while allowing electromagnetic radiation to be incident on the detector surface of the photo-multiplier.

In order to reduce the exposure of the detector surface 180 of the photo-multiplier 160 to stray charged particles, various protective measures can be taken according to the present invention. In a first exemplary embodiment of the present invention, illustrated in FIG. 2, an off-axis structure 200 is interposed between the resonant structure 100 and the detector surface 180 of the photo-multiplier 160. By providing the off-axis structure 200 with a reflective surface 210, electromagnetic radiation or photons are reflected toward the detector surface 180 of the photo-multiplier 160 while at the same time absorbing stray charged particles. Stray particles may be absorbed by the reflective surface 210 or by any other part of the off-axis structure 200. In this way, the photo-multiplier will provide a more accurate count of the photos emitted from the resonant structure 100.

Figure 3:
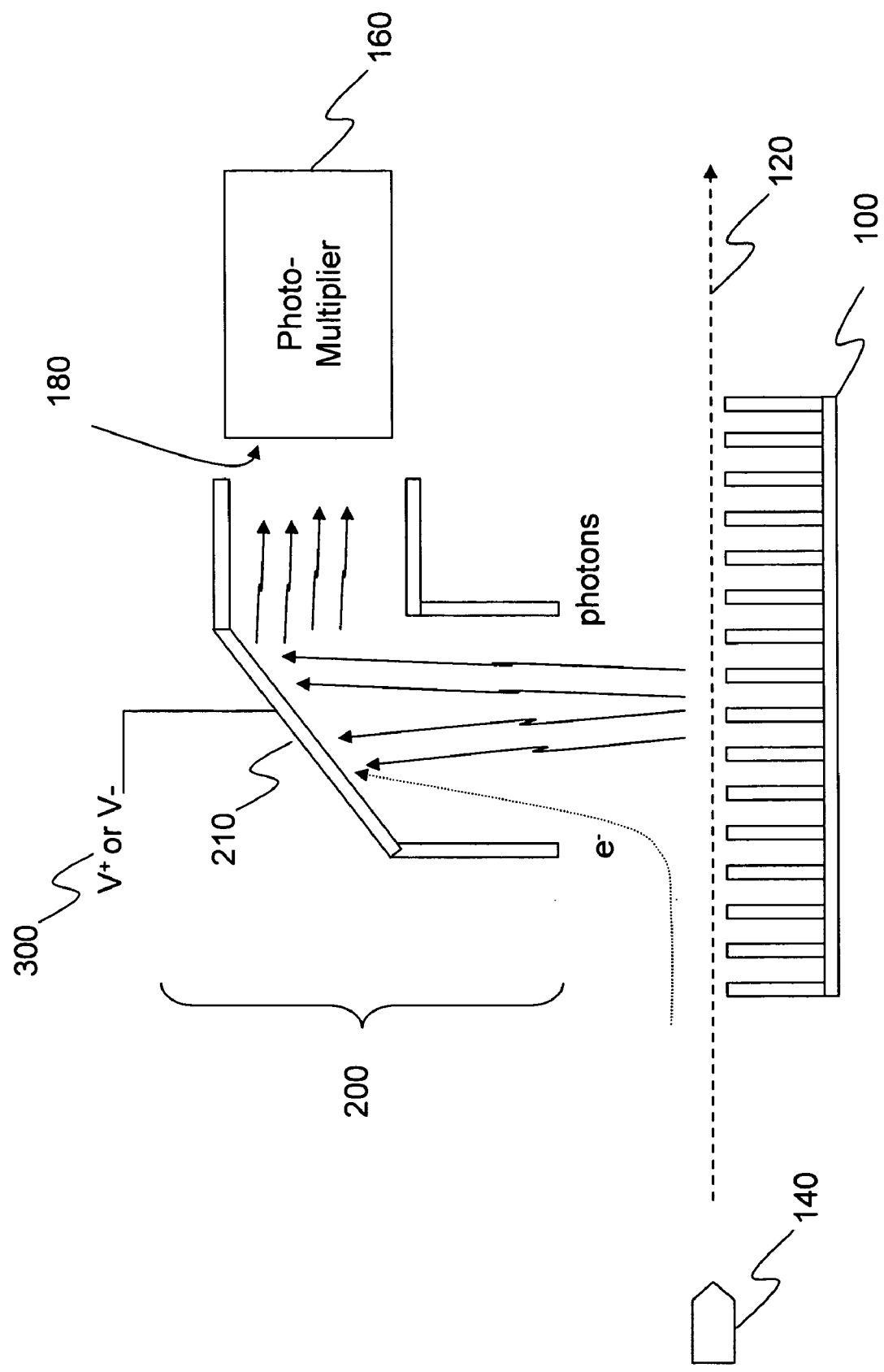
FIG. 3 is a top view of an electrically-biased structure for protecting a photo-multiplier from stray charged particles while allowing electromagnetic radiation to be incident on the detector surface of the photo-multiplier.

As shown in FIG. 3, in another embodiment of the off-axis structure 200, off-axis structure 200 is electrically biased using a voltage source 300 to attract the stray charged particles. In the case of stray electrons or negatively charged particles or ions, the voltage source 300 will be a positive voltage source. In the case of stray positively charged particles or ions, the voltage source 300 will be a negative voltage source. The voltage source 300 may bias a single segment or surface (e.g., just the reflective surface 210) of the off-axis structure 200 while remaining isolated from other segments. However, the voltage source 300 may alternatively bias a number of segments or sides of the off-axis structure 200 or the entire off-axis structure 200.

Figure 4:
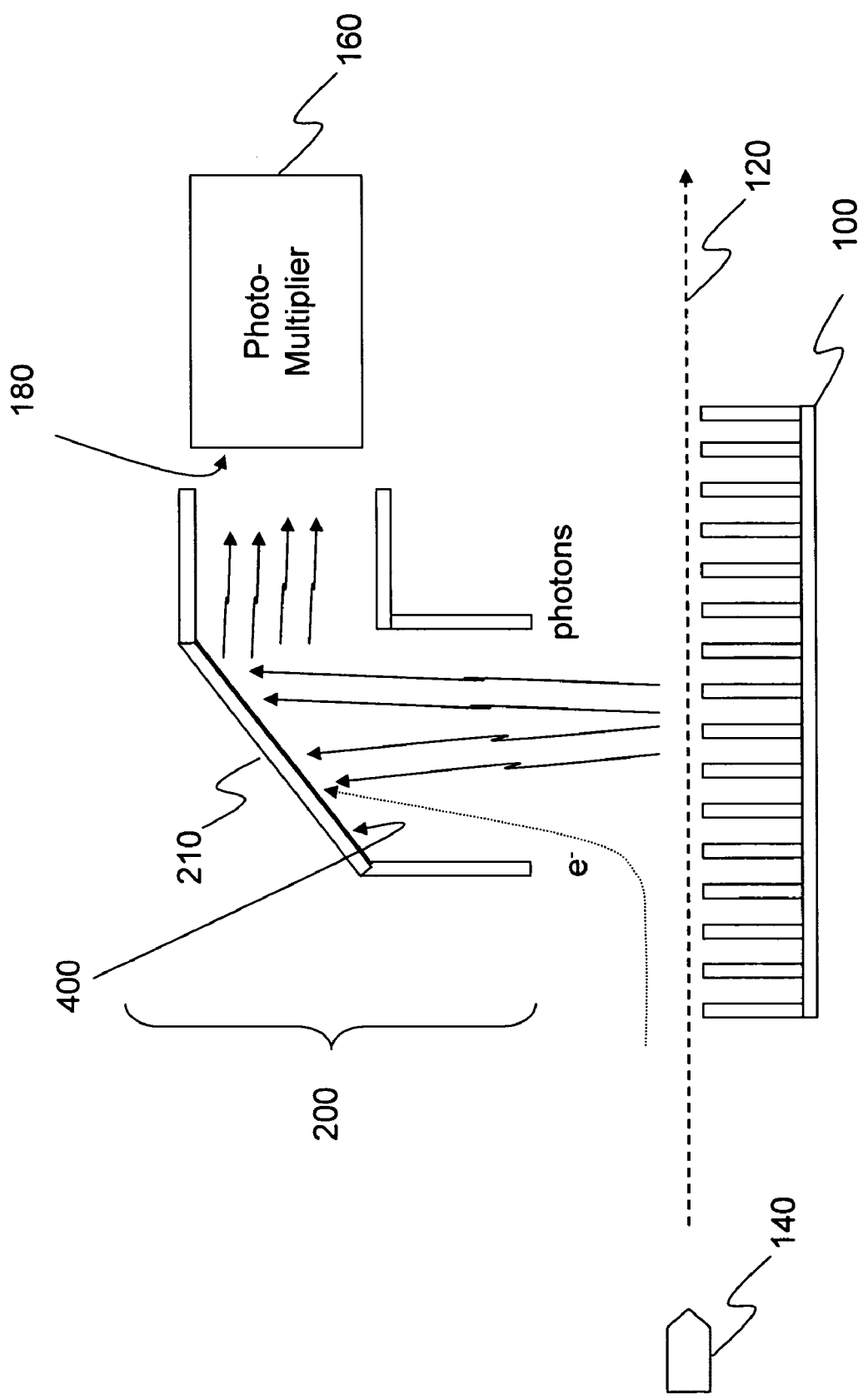
FIG. 4 is a top view of a structure including an absorbing coating for protecting a photo-multiplier from stray charged particles while allowing electromagnetic radiation to be incident on the detector surface of the photo-multiplier.

As shown in FIG. 4, in another embodiment of the off-axis structure 200, off-axis structure 200 is supplemented with an absorbing material 400 on at least one surface of the off-axis structure 200, and preferably on the reflective surface 210. Such a material can be selected to coincide with the charge type of the stray charged particles to be absorbed or attracted. While illustrated as covering only a single segment of the off-axis structure 200, the absorbing material 400, may instead be applied to several surfaces thereof. The absorbing material 400 may integrated onto at least one surface of the off-axis structure 200 or may be coated onto at least one surface of the off-axis structure 200.

Figure 5:
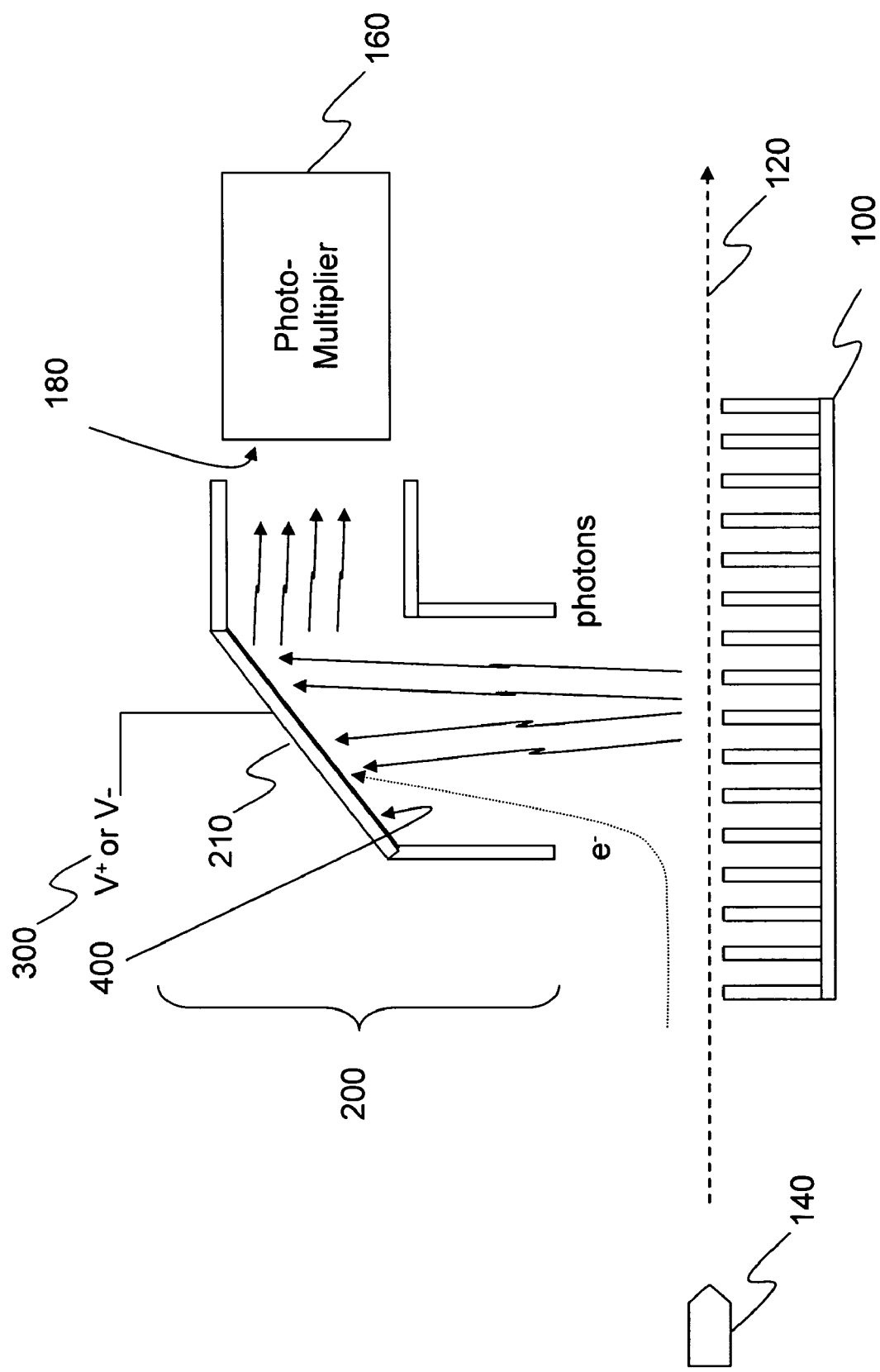
FIG. 5 is a top view of an electrically-biased structure including an absorbing coating for protecting a photo-multiplier from stray charged particles while allowing electromagnetic radiation to be incident on the detector surface of the photo-multiplier.

As shown in FIG. 5, in another embodiment of the off-axis structure 200, off-axis structure 200 is supplemented with both the absorbing material 400 of FIG. 4 and the voltage source 300 of FIG. 3.

Figure 6:
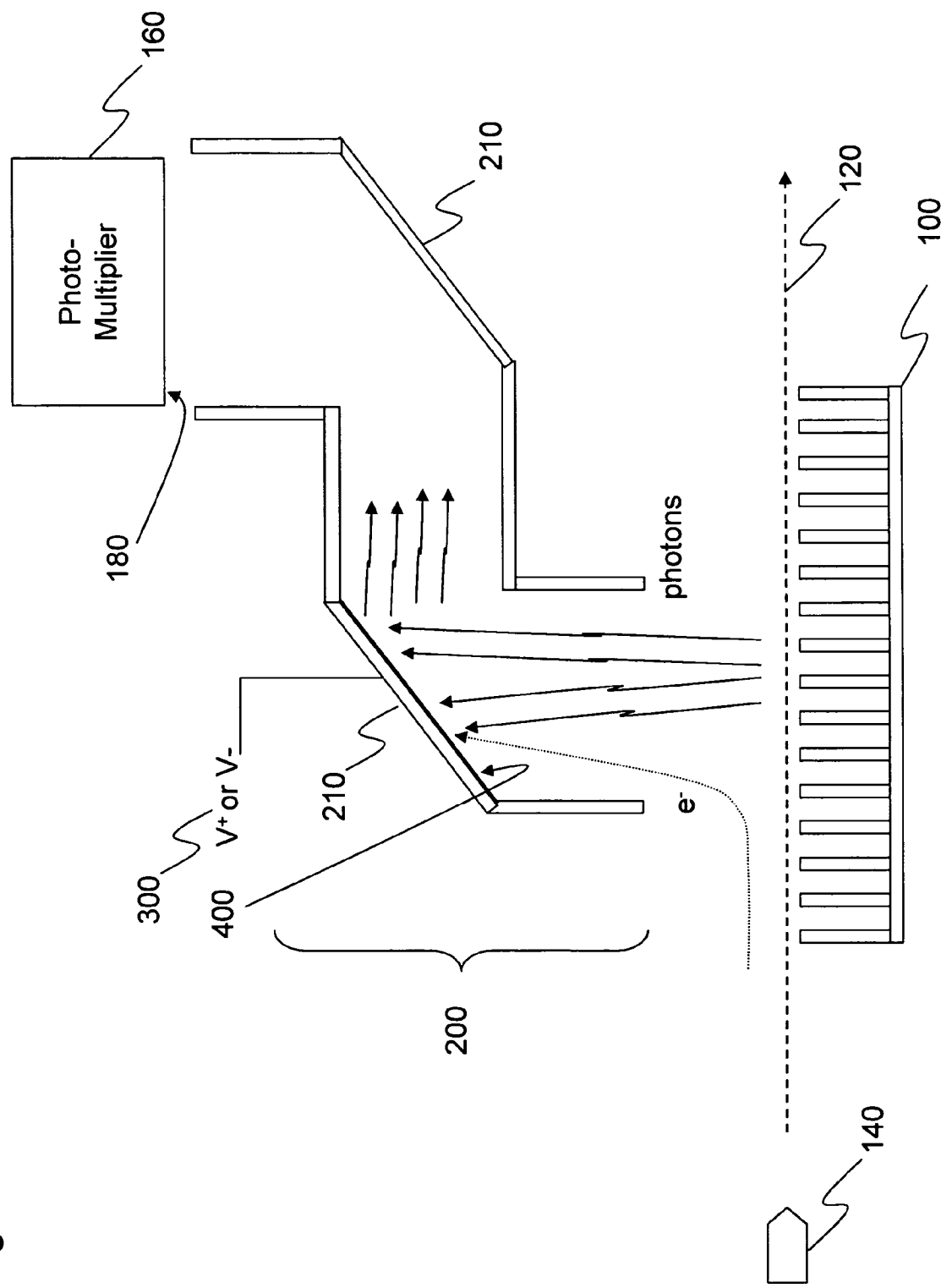
FIG. 6 is a top view of an electrically-biased structure including an absorbing coating and two reflective surfaces for protecting a photo-multiplier from stray charged particles while allowing electromagnetic radiation to be incident on the detector surface of the photo-multiplier.

As shown in FIG. 6, in another embodiment of the off-axis structure 200, the off-axis structure 200 of FIGS. 2-5 is supplemented with a second reflective surface 210 such that the detector surface 180 of the photo-multiplier 160 is even more protected from stray charged particles.

Figure 7:
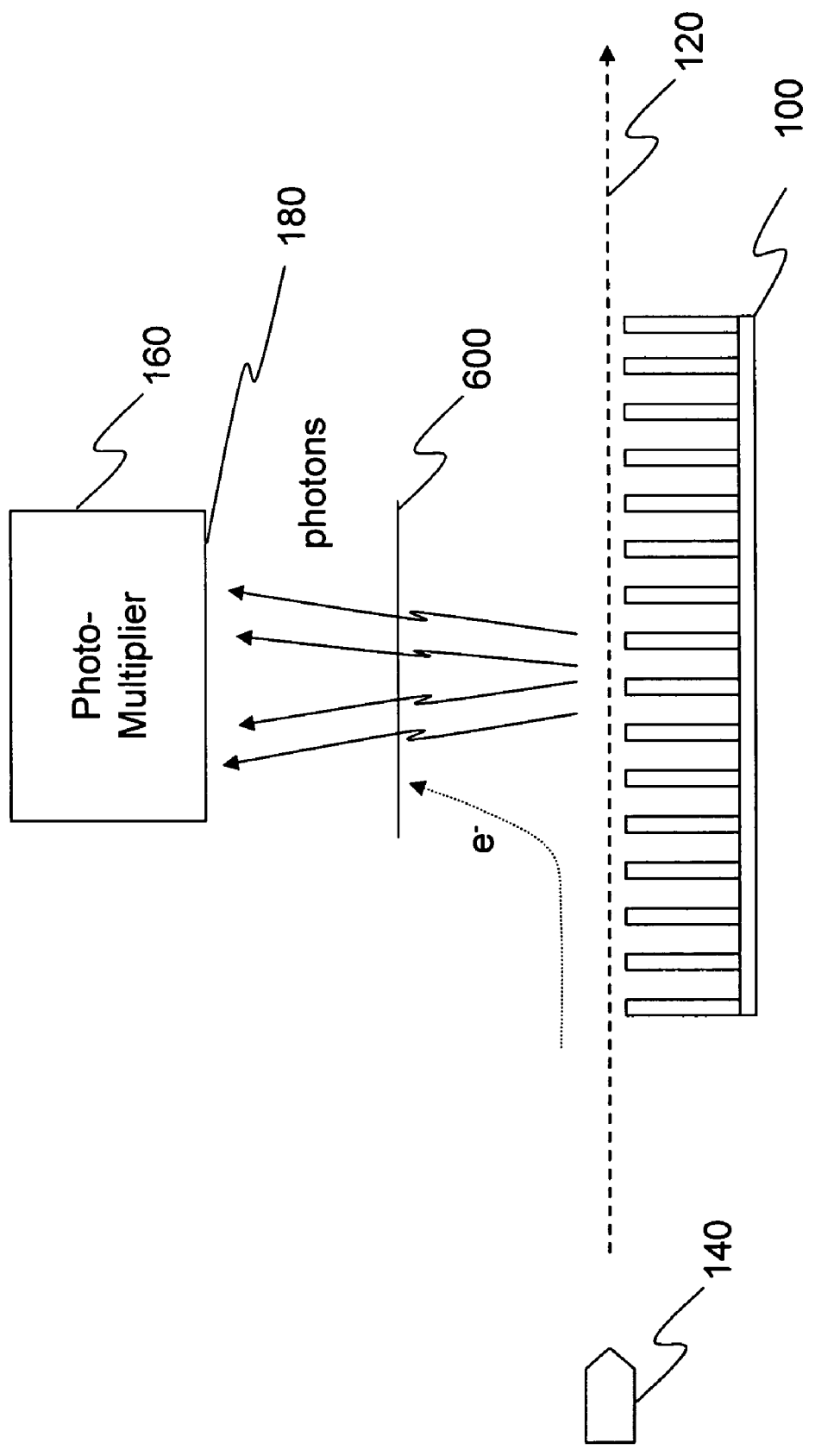
FIG. 7 is a top view of a structure including an absorbing barrier for protecting a photo-multiplier from stray electrons while allowing electromagnetic radiation to be incident on the detector surface of the photo-multiplier.

As shown in FIG. 7, in one embodiment of the present invention, rather than utilizing an off-axis structure 200 (as in FIGS. 2-6), the detector surface 180 of the photo-multiplier 160 is instead protected by an absorbing barrier 600 that is interposed between the resonant structure 100 and the photo-multiplier 160. In one embodiment, the absorbing barrier 600 is transmissive to light (e.g., IR, visible and/or UV). In another embodiment the absorbing barrier 600 is transmissive to electromagnetic radiation having a frequency higher than that of light (e.g., X-ray or gamma-ray).

While certain configurations of structures for protecting a photo-multiplier 160 from stray charged particles have been illustrated for the purposes of presenting the basic structures of the present invention, one of ordinary skill in the art will appreciate that other variations are possible which would still fall within the scope of the appended claims.

The invention claimed is:

1. A protected photo-multiplier for detecting electromagnetic radiation emitted from a resonant structure, comprising:
   a photo-multiplier for detecting the electromagnetic radiation having a frequency in excess of a microwave frequency;
   an off-axis structure interposed between the photo-multiplier and the resonant structure, the off-axis structure including at least one reflective surface for reflecting the electromagnetic radiation emitted from the resonant structure toward the photo-multiplier and at least one absorbing surface for absorbing charged particles emitted from or near the resonant structure; and
   an electrical bias for biasing at least one surface of the off-axis structure that is exposed to the electromagnetic radiation emitted from the resonant structure.

2. The protected photo-multiplier as claimed in claim 1, wherein the at least one reflective surface and the at least one absorbing surface are one and the same.

3. The protected photo-multiplier as claimed in claim 1, wherein the at least one reflective surface and the at least one absorbing surface are different surfaces.

4. The protected photo-multiplier as claimed in claim 1, wherein the at least one reflective surface comprises a mirror.

5. The protected photo-multiplier as claimed in claim 1, wherein the at least one reflective surface comprises an absorbing coating covering at least a portion of the at least one reflective surface that is exposed to the electromagnetic radiation emitted from the resonant structure.

6. The protected photo-multiplier as claimed in claim 1, further comprising an absorbing material on at least one surface of the off-axis structure that is exposed to the electromagnetic radiation emitted from the resonant structure.

7. The protected photo-multiplier as claimed in claim 1, wherein the electrical bias comprises a positive voltage source.

8. The protected photo-multiplier as claimed in claim 1, wherein the electrical bias comprises a negative voltage source.

9. The protected photo-multiplier as claimed in claim 1, further comprising an absorbing material on at least one surface of the off-axis structure that is exposed to the electromagnetic radiation emitted from the resonant structure.

10. The protected photo-multiplier as claimed in claim 1, wherein the at least one reflective surface comprises at least two reflective surfaces.

11. The protected photo-multiplier as claimed in claim 1, wherein the charged particles comprise electrons.

12. The protected photo-multiplier as claimed in claim 1, wherein the electromagnetic radiation comprises light.

13. The protected photo-multiplier as claimed in claim 1, wherein the electromagnetic radiation comprises at least one of infra-red, visible and ultra-violet light.

* * * * *